United States Patent Office 3,456,013
Patented July 15, 1969

3,456,013
POLYOXYALKYLENE-CONTAINING TERTIARY AMINES
Richard R. Egan, Edina, and Leon D. Smiens, Minneapolis, Minn., assignors to Ashland Oil & Refining Company, Ashland, Ky., a corporation of Kentucky
No Drawing. Filed June 6, 1966, Ser. No. 555,265
Int. Cl. C07c 85/02, 93/04; C08g 30/08
U.S. Cl. 260—584                    4 Claims

ABSTRACT OF THE DISCLOSURE

Liquid tertiary amines are provided by the condensation of a higher aliphatic secondary amine with a mixture of ethylene oxide and propylene oxide. The quaternary ammonium derivatives of such tertiary amines are surface active materials having utility in a variety of applications.

---

This invention relates to liquid polyoxyalkylene tertiary amines. In another aspect, it relates to a process for the preparation of such materials by the condensation of secondary fatty amines with alkylene oxide.

Tertiary amines which contain two fatty radicals, i.e., aliphatic hydrocarbon radicals of 8 to 26 carbon atoms, are useful as chemical intermediates for a wide variety of applications. Thus, the tertiary amines are useful as chemical intermediates in the preparation of fabric softeners, hair conditioners, disinfectants, lubricants, and in the preparation of other products in the lubricant, detergent, and cosmetic industry. Tertiary amines are furthermore useful per se and are employed as catalysts in various chemical reactions. To a large measure, the chemical and physical properties of these tertiary amines determine the properties of such chemical derivatives prepared from the amine. Thus, water solubility of quaternary ammonium salts or esters prepared from the tertiary amines is critically affected by the specific chemical composition of the tertiary amine. Furthermore, in many of the derivatives formed from the tertiary amine, minor concentrations of unreacted amine remain the product which are preferably not removed from the end-use product because of the prohibitive cost of such purification. The properties of the amine are, therefore, of considerable importance in regard to stability, color, odor, and end-use performance of the derivative product. Additionally, since the purification of the tertiary amine is generally easier than the purification of the derivative of the tertiary amine, particularly where quaternary ammonium compounds are prepared from the tertiary amine, the properties of the amine, to the extent that they affect the ability to purify the amine, are of significant importance. The foregoing considerations are, to a large measure, equally applicable to direct uses of the tertiary amine.

It is an object of the present invention to provide novel polyoxyalkylene-containing tertiary amines.

It is another object of the present invention to provide novel polyoxyalkylene-containing tertiary amines which can be readily purified to be color-free and odor-free.

A further object of the present invention is to provide tertiary amines which, in the form of quaternary ammonium compounds, possess water solubility and utility as active fabric softeners.

Other objects and advantages will become apparent from the following disclosure and claims.

The tertiary amines of the present invention have the general formula:

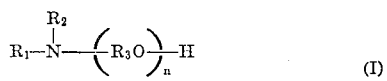
(I)

wherein $R_1$ and $R_2$ are aliphatic hydrocarbon radicals having from 12 to 20 carbon atoms, which can be the same or different, and wherein $R_3O$ is a heteric polyoxyalkylene chain of oxyalkylene units, the total of these oxyalkylene units in the chain being $n$, which is an integer of 3 to 12 and preferably 4 to 7, said polyoxyalkylene chain consisting of randomly distributed oxyethylene and oxypropylene units in a ratio of 1.5 to 4 and preferably 2 to 4.

The polyoxyalkylene-containing tertiary amine of this invention is a condensation product of a secondary monoamine containing two aliphatic hydrocarbon radicals with a mixture of ethylene oxide and propylene oxide. It is well recognized in the field of alkylene oxide chemistry that the oxyalkylation of a reactive hydrogen-containing compound with excess of an alkylene oxide results in the formation of a polymer of the alkylene oxide containing as a terminal group a hydroxyl group. The number of oxyalkylene units in each polymer molecule resulting from the oxyalkylation is not identical, but rather the product of the reaction is a mixture of closely related homologs wherein the statistical average number of oxyalkylene groups equals the number of moles of alkylene oxide per mole of reactive hydrogen compound employed, and the individual members present in the mixture contain varying numbers of oxyalkylene groups. Where, as in this invention, different oxyalkylene groups are distributed randomly throughout the oxyalkylene chain and, thus, in addition to the varying lengths of the polyoxyalkylene chain, result in a varying structure of the polyoxyalkylene chain, it is conventional to characterize the chain as a heteric polyoxyalkylene chain. Nevertheless, the properties of the compounds containing such polyoxyalkylene chains is characterized by the average length of the polyoxyalkylene chain and the average ratio of oxyethylene units to oxypropylene units in the polyoxyalkylene chain.

Alternatively, the polyoxyalkylene-containing tertiary amine product of the present invention is a mixture of compounds which can be illustrated by the formulas:

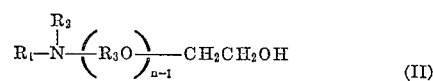
(II)

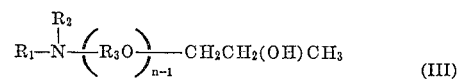
(III)

wherein $R_1$, $R_2$, $R_3O$, and $n$ are as defined above.

The polyoxyalkylene-containing tertiary amines of this invention can be produced by a process in which a secondary aliphatic hydrocarbon mono-amine having from 12 to 20 carbon atoms in each aliphatic hydrocarbon radical attached to the nitrogen is charged to a reactor and reacted at a temperature of 150°–280° F., preferably 200°–250° F., or higher, in the liquid phase with a mixture of ethylene oxide and propylene oxide. The two oxides can be separately and simultaneously charged to the reactor to provide said mixture, but preferably the two oxides are premixed together and charged to the reactor as a mixture. The relative amounts of the oxides in the separate streams or in the preformed mixture, as well as the total amount of the oxides used, are such as to achieve the desired oxyethylene-to-oxypropylene molar ratio and the desired total molar oxyalkylene units in the resulting tertiary amine. The oxyalkylation reaction is carried out in the presence of ionic alkaline catalysts such as the salts or the hydroxides of the alkali metals or the alkaline earth metals, and preferably also in the presence of a lower alkyl ($C_3$–$C_6$) secondary alcohol such as isopropanol. The lower alkyl secondary alcohols are employed in the process of the present invention as cosolvents and color inhibitors and results in purer tertiary amines, faster reaction time, ease of agitation, and improved homogeneity of the reaction mixture. The concentration of the secondary alcohols can vary to achieve these results and is generally within the range of 1 to 20% by weight of the secondary amine employed as the reactant.

The reaction can be carried out by charging the reactor with the secondary amine, the secondary alcohol, and the catalyst, covering the mixture with a nitrogen blanket, and heating the mixture to the desired reaction temperature. A mixture of ethylene oxide and propylene oxide containing the predetermined amounts and ratio of ethylene oxide and propylene oxide is then reacted with the secondary amine in the liquid phase. The ethylene oxide and the propylene oxide are preferably charged as a preformed liquid mixture which vaporizes in the reaction vessel. However, gaseous mixtures or separate streams of ethylene oxide and propylene oxide which are combined as a mixture in the reaction vessel can also be used.

The reaction can be conducted at autogenous pressures or, by increasing the nitrogen, at elevated pressures. In general, sufficient pressure is employed to maintain a liquid reaction mixture and, preferably, the oxides are charged on demand to maintain a constant pressure, e.g., 35–45 p.s.i.g., and desired reaction temperature to efficiently carry out the reaction. Although the reaction can be conducted at high pressures, pressures in excess of 200 p.s.i.g. are normally not employed in view of the necessity to employ high pressure equipment.

As a result of the reaction, the volume of the liquid reaction mixture increases and essentially all of the alkylene oxide charged is reacted with the secondary amine. The termination of the reaction is indicated by no further pressure drops and reaction times generally are in the range of 20 minutes to 2 hours. The catalyst is preferably sodium hydroxide or potassium hydroxide, and is generally employed in a concentration of 0.05 to 2% by weight of the secondary amine. The reaction product comprises the tertiary amine, alcohol, and catalyst residues. Residues, if any, are removed by filtration and the alcohol, if desired, can be distilled out to result in a liquid tertiary amine product of high purity with a freezing point below 65° F.

The secondary amines employed in the formation of the novel tertiary amines of the present invention are amines which contain two aliphatic hydrocarbon radicals of 12 to 20 and preferably of 16 to 18 carbon atoms each. The aliphatic hydrocarbon radicals can be linear, branched, or cyclic in structure and can be the same or different in each radical. The hydrocarbon radical can contain ethylenic unsaturation, although it is generally preferred to employ secondary amines containing only saturated hydrocarbon radicals. Mixtures of secondary amines can similarly be reacted to give tertiary amines within the scope of the present invention. Suitable secondary amines include di(dodecyl)amine, di(tridecyl)amine, di(tetradecyl)amine, di(pentadecyl)amine, di(hexadecyl)amine, di(heptadecyl)amine, di(octadecyl)amine, di(nonadecyl)amine, and di(eicoso)amine. Secondary amines of the type described are commercially available either in pure form or as mixtures such as Adogen 240, a di(hydrogenated tallow)amine, and Armine 2HT, a mixture consisting primarily of di(octadecyl)amine and di(hexadecyl)amine. A particularly preferred secondary amine is the di(hydrogenated tallow)amine.

The alkylene oxides employed in the process of this invention are ethylene oxide and 1,2-propylene oxide. It is necessary to use a mixture of these two oxides in order to obtain the desired randomness in the polyoxyalkylene chain essential to the desired properties in the tertiary amine. If ethylene oxide is the only oxide condensed with amine, the product is likely to be a solid and if propylene oxide is the only oxide condensed with the amine, derivatives of the tertiary amine are likely to be water-insoluble. Block copolymer chains obtained by sequential polymerization of the two alkylene oxides are similarly unsuitable for the formation of teritary amines having the desired properties since such block copolymer chains reflect the properties of each homopolymer rather than resulting in the desired properties.

The total amount of both alkylene oxides employed in this invention is from 3 to 12 and preferably 4 to 7 moles per mole of the secondary amine. The use of lower amounts of alkylene oxides will result in solid rather than liquid products regardless of the ratio of ethylene oxide to propylene oxide. At higher ratios of alkylene oxides to secondary amine, the properties of the polyoxyalkylene chain tend to adversely affect and overshadow the properties derivable from the amine structure or the quaternary ammonium structure in any quaternary ammonium compounds prepared from such tertiary amine.

The polyoxyalkylene-containing tertiary amines of the present invention are liquid at room temperature, are free of odor, of good color, and of high purity. When reacted with alkyl halides, alkyl sulfates, or similar compounds to form quaternary ammonium compounds or when reacted with organic or inorganic acids to form ammonium salts, the resulting quaternary ammonium compounds and ammonium salts are not only readily liquefied but, furthermore, are water-soluble in addition to exhibiting surface active properties, making the tertiary amines of the present invention extremely valuable in lubricating, detergent, and cosmetic compositions. The described combination of properties is, as indicated above, the result of the randomness of the polyoxyalkylene chain, the number of oxyalkylene units in the chain, and the ratio of oxyethylene units to oxypropylene units in the chain. It will be apparent that the various properties described are, to a certain degree, affected by the nature of the secondary amine employed but that such can be compensated for by adjusting the mole ratio of alkylene oxides to secondary amine and the mole ratio of ethylene oxide to propylene oxide within the limits set forth above. Thus, for the preferred di(hydrogenated tallow)amine, the most desirable combination of properties is obtained with a polyoxyalkylene chain length of 7 and an oxyethylene-to-oxypropylene ratio of 4:1.5.

The following examples further illustrate the formation and properties of the novel tertiary amines of the present invention but it should be understood that this invention is not to be limited to the particular details set forth in these examples. Unless otherwise stated, all units of quantity are by weight.

EXAMPLE 1

Into a 2-liter, stainless steel autoclave is charged 505 g. of di(hydrogenated tallow)amine, 50 g. of isopropyl alcohol, and 2 g. of potassium hydroxide. The reaction mixture is blanketed with nitrogen, heated to a temperature of 250° F. and pressured to 100 p.s.i.g. A mixture of 88 g. of ethylene oxide and 58 g. of propylene oxide is then charged into the reaction vessel, under agitation, over a period of 5–8 minutes. The reaction is continued for an additional hour with agitation. On removal of catalyst residues by filtration and the isopropanol by distillation, a liquid tertiary amine containing on the average two oxyethylene units and one oxypropylene unit in random fashion is obtained. The tertiary amine has a hydrogen chloride equivalent of 645, a cloud point of 70° F., and a Gardner color of 6. After standing for a period of 24 hours at room temperature, a slight haze develops in the liquid.

EXAMPLES 2–6

Following the procedure of Example 1, tertiary amines are prepared using per mole of di(hydrogenated tallow) amine the moles of ethylene oxide and propylene oxide indicated in the table hereinbelow. The structure and properties of the resulting di(hydrogenated tallow)-polyoxy- (ethylene-propylene)amines are similarly listed in the table below.

TABLE

| Example | Moles of ethylene oxide | Moles of propylene oxide | Average degree of polymerization of polyalkylene oxide chain in III° amine | HCl equivalent | Cloud point (° F.) | Gardner color | Appearance after 24 hours at room temperature |
|---|---|---|---|---|---|---|---|
| 2 | 3 | 2 | 5 | 656 | 86 | 6 | Viscous liquid with heavy precipitate |
| 3 | 1 | 2 | 3 | 685 | 98 | 7 | Solid. |
| 4 | 3 | 1 | 4 | 694 | 63 | 6 | Clear liquid. |
| 5 | 3 | 1.5 | 4.5 | 715 | 60 | 7 | Do. |
| 6 | 4 | 1.5 | 5.5 | 768 | 55 | 7 | Do. |

The foregoing table points up the criticality of the ratio of ethylene oxide to propylene oxide units in the chain as well as the criticality of the polyoxyalkylene chain length. A sample of the tertiary amine of Example 6 was analyzed and was found to contain 1.2% impurities other than amines and 98% of the tertiary amine.

It will be apparent from the foregoing examples that other secondary amines falling within the scope of suitable diamines as defined hereinabove can be substituted for the di(hydrogenated tallow)amine in the above-described procedures to result in corresponding tertiary amines. Various modifications and alterations of this invention will become apparent to those skilled in the art without departing from the scope and spirit of this invention, and it should be understood that the foregoing description and examples are not to be construed as limiting.

The utility of the tertiary amines of the present invention in the formation of quaternary ammonium compounds having a unique combination of properties is further amplified in cofiled copending application S.N. 555,264, now U.S. Patent No. 3,428,682.

What is claimed is:

1. A tertiary amine having the general formula:

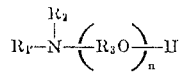

wherein $R_1$ and $R_2$ are alkyl or alkenyl radicals of 12 to 20 carbon atoms, said $R_1$ and $R_2$ being the same or different, and $R_3O$ is a heteric polyoxyalkylene chain of randomly distributed oxyethylene and oxypropylene units, and polyoxyalkylene chain having from 4 to 7 oxyalkylene units, the ratio of said oxyethylene to oxypropylene units varying from 1.5 to 4.0.

2. The tertiary amine of claim 1, wherein the ratio of oxyethylene to oxypropylene units is from 2 to 3.

3. The tertiary amine of claim 1, wherein $R_1$ and $R_2$ are hydrogenated tallow.

4. The tertiary amine or claim 3, wherein the oxyethylene-to-oxypropylene ratio is from 2 to 3.

References Cited

UNITED STATES PATENTS 1,701,239 2/1955 Ryznar.
3,231,619 1/1966 Speranza.

FOREIGN PATENTS 246,457 8/1963 Australia.

CHARLES B. PARKER, Primary Examiner
R. L. RAYMOND, Assistant Examiner

U.S. Cl. X.R.
252—51.5, 152; 260—567.6, 999